H. N. Brooks.
Dairy-House.
No. 83,827.      Patented Nov. 10, 1868.
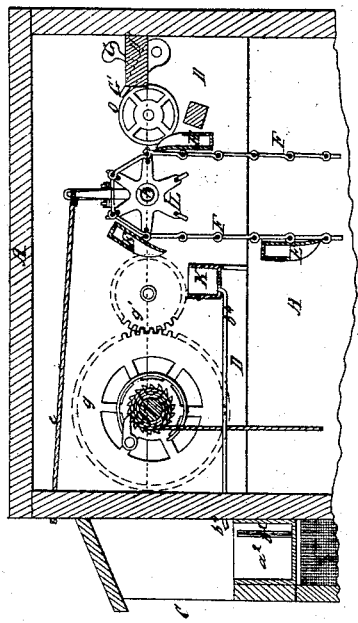
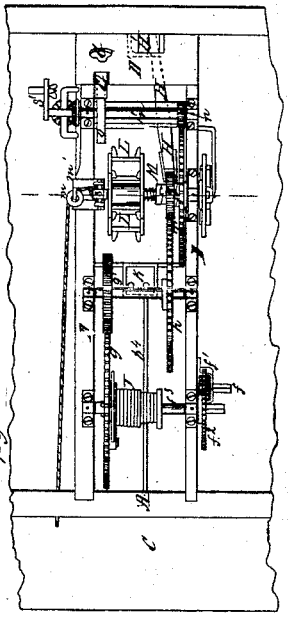
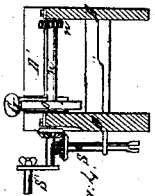
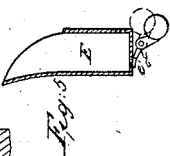
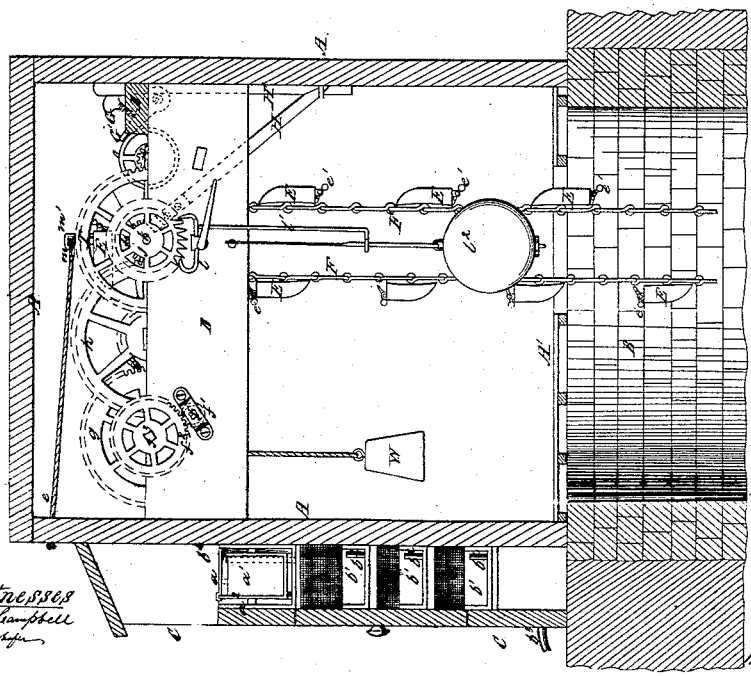
Witnesses
Inventor:
Horatio N. Brooks

HORATIO N. BROOKS, OF BLOOMINGTON, ILLINOIS.

*Letters Patent No. 83,827, dated November 10, 1868.*

IMPROVEMENT IN COMBINED WATER-ELEVATOR AND DAIRY.

The Schedule referred to in these Letters Patent and making part of the same.

*To all whom it may concern:*

Be it known that I, HORATIO N. BROOKS, of Bloomington, in the county of McLean, and State of Illinois, have invented Combined Water-Elevator and Dairy; and I do hereby declare that the following is a full, clear, and exact description thereof, reference being had to the accompanying drawings, making a part of this specification, in which—

Figure 1 is a vertical section through the milk-room and well-house, showing the apparatus for elevating water, and the dairy-apartment.

Figure 2 is a vertical sectional view of the elevator and upper portions of the well-house and milk-apartment, showing the manner of receiving water from the well-buckets and conducting the water into the milk-apartment.

Figure 3 is a top view of the elevating-apparatus.

Figure 4 is a sectional view of a device for working a churn-dasher.

Figure 5 is a sectional view of one of the well-buckets.

Figure 6 is a section, taken transversely through fig. 3, in the vertical plane indicated by red line $x\ x$.

Similar letters of reference indicate corresponding parts in the several figures.

The object of my invention is to employ a water-elevating apparatus, which is operated and controlled by springs or weights, as will be hereinafter described, in conjunction with apartments which are adapted for receiving and preserving milk, butter, meats, and other articles, said elevating-apparatus being brought in communication with said dairy or preserving-apartments in such manner that cool water will be supplied to the latter in considerable quantities, and caused to flow around the several chambers therein, and thence conducted off to a barn-yard or other locality, for supplying stock, and for other purposes. The invention also provides for communicating motion and power to machinery, for churning and other purposes, from the same motive-power which is employed for supplying water to the dairy or refrigerating-apartments, all as will be hereinafter explained.

To enable others skilled in the art to understand my invention, I will describe its construction and operation.

In the accompanying drawings, A represents a building, of suitable capacity to contain the water-elevating machinery, and shelter it safely from the weather, and also to afford an apartment in which one or more churns may be placed, and the operation of churning conveniently conducted.

This building is erected over a well of water, B, and provided with a flooring, A', which will serve as a cover for the top of the well, except that portion through which water-elevating buckets are required to rise and descend.

The building A should be provided with doors and windows, for affording light, entrance, and exit.

On one side of this building is an apartment, C, which is provided with suitable door-openings in front and at the ends, some of which openings may be covered with perforated metal or wire screens, $b$, for keeping out insects, but allowing of a free circulation of air into and through said apartment.

Within this apartment are several horizontal water-tanks, $b^1$, which are arranged one above another, and provided with overflow-pipes $b^2$.

The pipes $b^2$ extend up nearly to the top of their respective tanks, so that the latter will be kept nearly full of water, the surplus water running off through the said pipes, from one tank to another, until it reaches the lowermost tank, when it is conducted off through a pipe, $b^3$, to a barn-yard or other locality.

Above the highest tank, $b^1$, is a cistern, $a^2$, which is also provided with an overflow-pipe, $b^2$, extending up nearly to its upper end, for the purpose of allowing this cistern to be kept full of water, and carrying off the surplus water into the tank $b^1$ below.

Within this cistern $a^2$ is a vessel, $a^1$, which is mounted upon short legs, and provided with a dished hinged cover, $a$. This vessel is designed for containing meats, vegetables, and other articles, to be kept cool, and it is somewhat smaller than the cistern within which it is placed, so that it may be surrounded by water. The cover $a$ being dished, as stated, will hold water, which will flow off at the back when this cover is raised.

It will be seen, from the above description, that water flowing from the pipe $b^4$ will first fill the cistern $a^2$, and then flow into the highest tank, $b^1$, and fill this tank; it will thence flow into the next tank, $b^1$, and so on, from one tank to another, to the escape-pipe $b^2$, which latter will conduct the water to any desired point remote from the structure.

By this arrangement, the vessels in the apartment C can be kept very cool, without the use of ice, as cool water, direct from a well, can be caused to flow in a constant stream through all of said vessels.

The machinery for elevating water from the well B is applied within the well-house A, and supported by a horizontal frame, D, which is arranged at a proper height to elevate water into a tank, K, to be conducted off, by the feed-pipe $b^4$, into the cistern $a^2$, as above described.

The water is elevated by means of buckets E, which are applied to an endless chain, F, and provided with loaded air-escape valves $e'$ in their bottoms, shown clearly in figs. 1 and 5.

This endless chain of buckets is carried by a light open-work drum, L, which is made so that its arms will have a slight springy movement, for the purpose of preventing the accumulation of ice upon them.

The drum L is applied loosely upon its horizontal shaft, $k$, so that, when desired, this shaft may be caused to turn without turning this drum.

On one end of the drum L is a toothed surface, 1, which is designed to engage with a clutch, 2, made fast upon the shaft $k$, as shown in fig. 6.

When the drum is engaged with this clutch, it will rotate with the shaft $k$, and cause water to be elevated to the tank K by the buckets, as described.

By means of a lever, $s$, which is applied to a standard, $m'$, and a rope, $e$, which is connected to the upper end of said lever, and carried around a grooved pulley, $m$, to a point outside of the well-house, the drum L can be moved to one side and disengaged from its shaft $k$, thereby stopping the flow of water to the apartment C.

The drum L is held in place against its clutch 2 by means of a spring, which is coiled around the shaft $k$, and which presses against a fixed clutch, M, on this shaft.

Between the clutch M and a large spur-wheel, T, is a pinion spur-wheel, $i$, which is applied loosely upon shaft $k$, and constructed with toothed surfaces on both ends of its hub.

The toothed surface on one end of the hub of the pinion $i$ engages with the clutch M, and the toothed surface on the opposite end, at the hub of this pinion, engages with a toothed surface upon the hub of the spur-wheel T.

This wheel T is applied loosely upon its shaft $k$, and engages with it, by means of the fixed clutch M, through the medium of the wheel $i$, as described.

The forked end of a lever, H, is applied to the pinion-wheel $i$, for the purpose of moving this pinion laterally, and engaging it with or disengaging it from the fixed clutch M.

When wheel $i$ is engaged with the fixed clutch M, and disengaged from the wheel T, said wheel $i$ will rotate the shaft $k$ and its drum L, but will not rotate the wheel T.

When wheel $i$ is engaged with wheel T, and disengaged from the clutch M, it will rotate this wheel T, but not the drum L.

On the outer end of the shaft $k$, a toothed escapement-wheel, $j$, is keyed, which is provided with oscillating pallets $l$ and a pendulum, $l^2$, like a common clock-movement.

The large wheel T engages with a pinion spur-wheel, $n$, which is keyed to a horizontal shaft, $n'$, carrying on one end a crank and adjustable wrist-pin, $S^1$, for giving a vertical motion to the dash-rod of a churn.

A vertical shaft, $S^2$, may be engaged with the shaft $n'$, by means of two bevel-spur wheels, as shown in fig. 4, which will communicate a rotary motion to a churn-dasher, and, if it is desired to operate a barrel-churn, a belt-pulley may be keyed upon the shaft $n'$, for this purpose.

To prevent the shaft $n'$ from receiving too rapid motion, and for regulating the speed thereof, a friction-brake wheel, O, is applied to it, which wheel is acted upon by a rubber, G', and caused to press more or less upon the periphery of this wheel O by means of a regulating set-screw, G, which is applied to a cross-bar, D', of the frame D, as shown in the drawings.

The wheels and their connections above described are operated by means of a weight, W, applied to a rope or chain which is wound upon a drum, J, and acting upon wheel $i$, through the medium of a train of wheels, $h\ g'\ g$, as shown in the drawings.

The drum J, with its shaft $f^3$, is engaged with the spur-wheel $g$, by means of a ratchet and pawl, similarly to the winding-movement of a clock.

On one end of the drum-shaft $f^3$ a large spur-wheel, $f^2$, is keyed, which engages with a pinion spur-wheel, $f^1$, upon a short shaft, $f$.

This short shaft $f$ is made to receive the square socket of a lever-crank, for winding up the rope of weight W upon the drum J, during which operation the wheel $g$ does not turn.

When the weight W is wound up, motion will be communicated to the wheel $i$, through the train of wheels above described, and this wheel can be adjusted, by means of lever H, so as to rotate the drum L, for raising water, or to rotate the shaft $n'$ for driving a churn.

If at any time it is desired to raise water or to drive the churning-power by manual labor, this can be done by removing the pallets $l$, properly adjusting the pinion $i$, and applying a hand-crank upon the extremity of the shaft $k$.

I prefer to use a weight, $w$, as the prime motor, but, if desirable, a spring, of suitable strength, may be applied to the drum J.

From the above description, it will be seen that I combine with a safe or preserving-apartments, C, an automatic water-elevator, which will keep a stream of fresh, cool water flowing constantly through the several chambers of said apartment, thus preserving articles placed therein, without the use of ice; and, while this is the case, it will also be seen that the water-elevating device can be thrown out of gear and stopped at pleasure, when it is desired to employ all the available power to operate the churning-devices.

I do not claim as new an automatic churn-power nor an automatic water-elevating power; but What I do claim as my invention, and desire to secure by Letters Patent, is—

The arrangement of a cooling-apartment, C, constructed and furnished substantially as described, and an automatic water-elevating apparatus, substantially as set forth.

HORATIO N. BROOKS.

Witnesses:
LUMAN BURR,
PETER FOLSOM.